(12) United States Patent
Braudaway

(10) Patent No.: US 8,451,472 B2
(45) Date of Patent: *May 28, 2013

(54) IMMEDIATE VERIFICATION OF PRINTED COPY

(75) Inventor: Gordon Wesley Braudaway, Yorktown Heights, NY (US)

(73) Assignee: InfoPrint Solutions Company, LLC, Boulder, CO (US)

( * ) Notice: Subject to any disclaimer, the term of this patent is extended or adjusted under 35 U.S.C. 154(b) by 88 days.

This patent is subject to a terminal disclaimer.

(21) Appl. No.: 12/952,423

(22) Filed: Nov. 23, 2010

(65) Prior Publication Data

US 2011/0096349 A1  Apr. 28, 2011

Related U.S. Application Data

(63) Continuation of application No. 10/630,289, filed on Jul. 30, 2003, now Pat. No. 7,864,349.

(51) Int. Cl.
| | |
|---|---|
| G06K 3/12 | (2006.01) |
| G06K 15/00 | (2006.01) |
| G06K 9/00 | (2006.01) |
| G06K 9/68 | (2006.01) |
| G06K 9/32 | (2006.01) |
| G03F 3/08 | (2006.01) |
| B41F 5/18 | (2006.01) |
| B41L 23/00 | (2006.01) |
| B42D 15/00 | (2006.01) |
| G03B 27/52 | (2006.01) |
| G03B 27/54 | (2006.01) |
| B41M 5/00 | (2006.01) |

(52) U.S. Cl.
USPC ......... 358/1.14; 358/1.12; 358/518; 358/520; 101/180; 101/181; 101/148; 101/211; 101/485; 283/72; 355/32; 355/35; 428/195.1; 382/112; 382/218; 382/295

(58) Field of Classification Search
USPC ............... 358/1.14, 1.12, 518, 520; 101/180, 101/181, 148, 211, 355, 485; 283/72; 355/32, 355/35; 428/195.1; 382/112, 218, 257, 295; 348/88; 356/71, 238.1, 394; 702/81, 83; 399/388, 397; 250/559.29, 559.46, 559.44
See application file for complete search history.

(56) References Cited

U.S. PATENT DOCUMENTS

| | | | |
|---|---|---|---|
| 4,561,103 A | 12/1985 | Horiguchi | |
| 6,810,156 B1 * | 10/2004 | Itoh | 382/300 |
| 6,952,485 B1 | 10/2005 | Davidson et al. | |
| 6,993,156 B1 * | 1/2006 | Szeliski et al. | 382/103 |
| 7,013,803 B2 * | 3/2006 | Hansen et al. | 101/181 |
| 2003/0219170 A1 * | 11/2003 | Ishido | 382/275 |

* cited by examiner

Primary Examiner — Steven Kau
Assistant Examiner — Neil R McLean
(74) Attorney, Agent, or Firm — Blakely, Sokoloff, Taylor & Zafman LLP

(57) ABSTRACT

Print verification is done by scanning the printed copies, thereby forming a stream of scanned images of the specific pages. Digitized images from the stream are then spatially aligned page by page, line by line and pixel (pel) by pixel (pel) with corresponding digitized images in a stream of source images. The source and scanned images are compared to find pel sequences that are different. These differences represent defects in the printed copies.

13 Claims, 11 Drawing Sheets

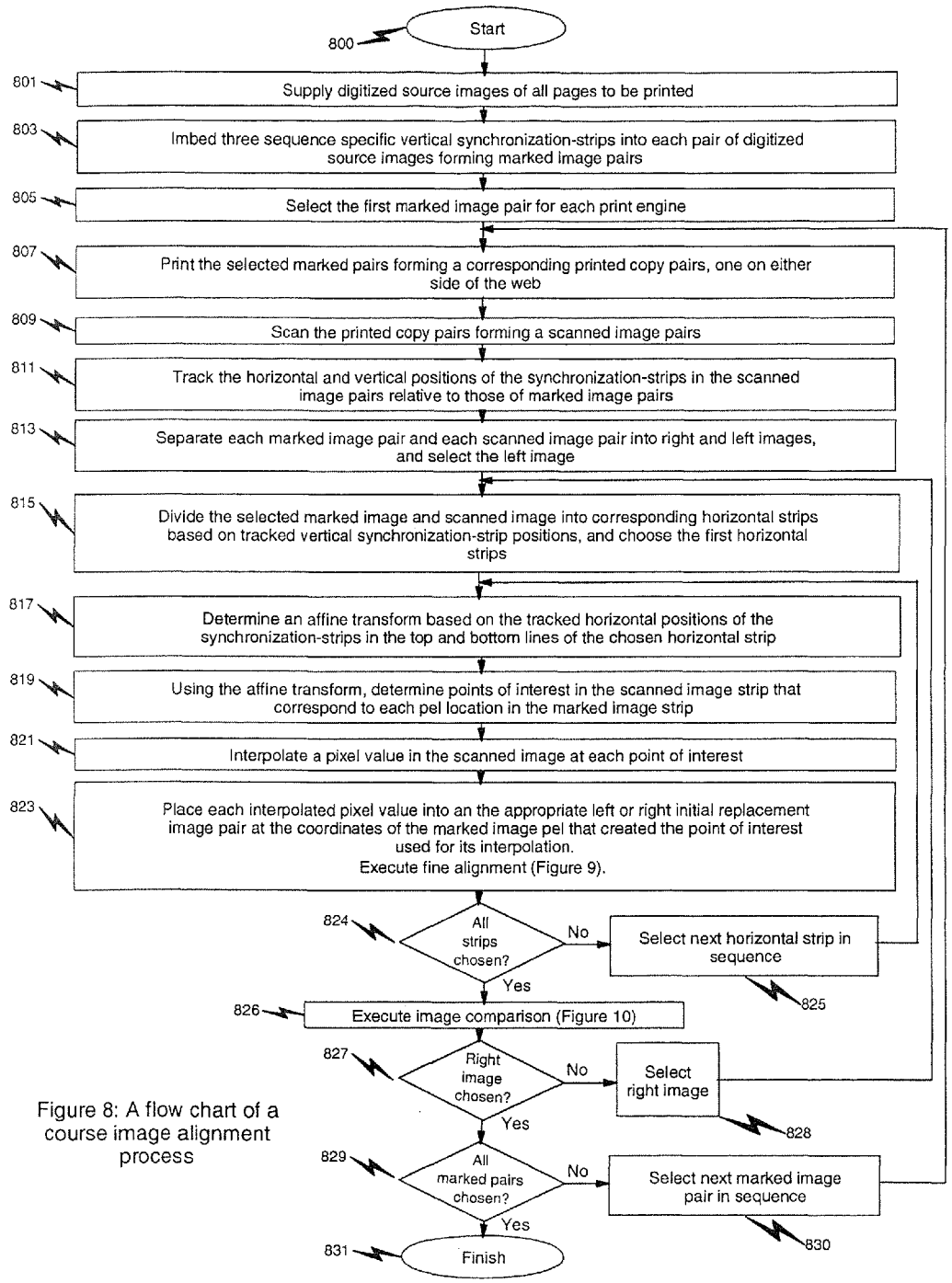
Figure 8: A flow chart of a course image alignment process

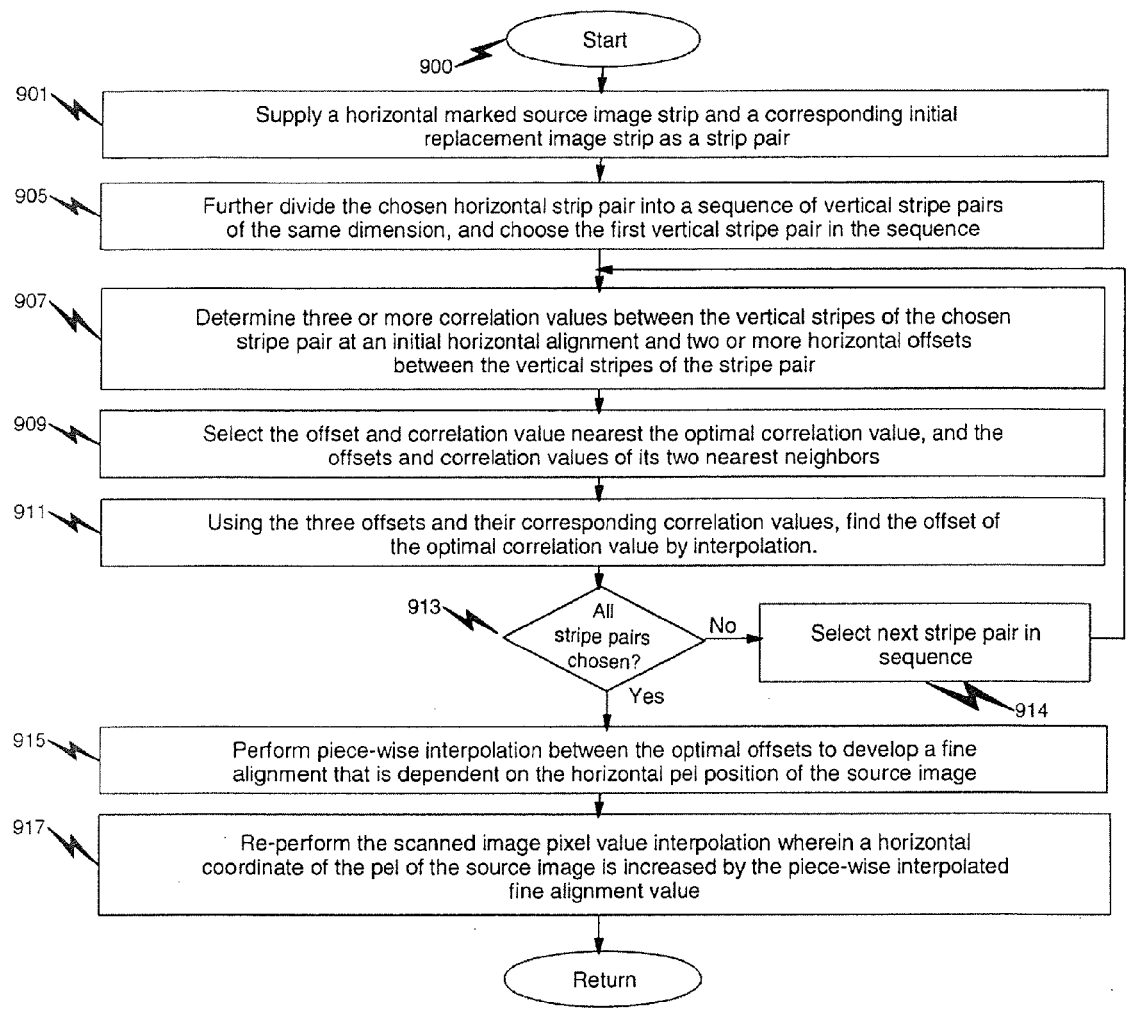
Figure 9: A flow chart of a fine image alignment sub-process

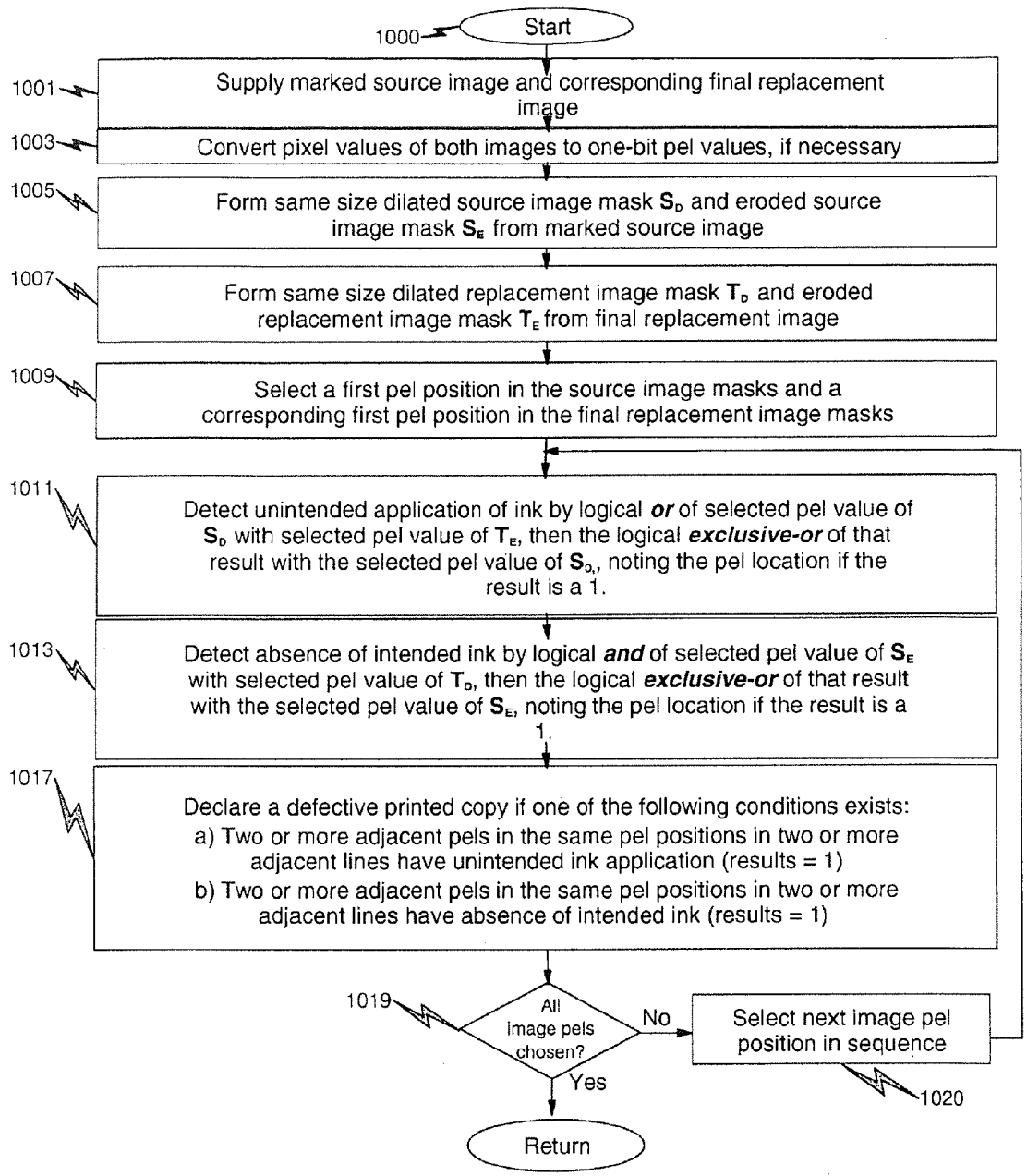
Figure 10: A flow chart of a sub-process for comparison of a scanned printed copy with a source image

IMMEDIATE VERIFICATION OF PRINTED COPY

The present patent application is a Continuation application claiming priority from application Ser. No. 10/630,289, filed Jul. 30, 2003 now U.S. Pat. No. 7,864,349.

FIELD OF THE INVENTION

This application relates to the field of high-speed digital printing. It is more specifically concerned with the immediate automatic verification of printed copy to determine the intended presence of ink on paper and the absence of unintended ink or other marks on paper.

BACKGROUND OF THE INVENTION

Definition of Terms and Constructs

Prior to the application of ink to paper which creates a printed copy, a digitized image of the matter to be printed is created. As used herein, a digitized image is an abstraction of a physical image that has been created or scanned. It is stored in a computer's memory as rectangular arrays of numbers corresponding to that image's (one or more) color planes. Each array element corresponds to a very small area of the printed image and is called a picture element, or pixel. The numeric value associated with each pixel for a monochrome image represents the magnitude of the average brightness of its single color (for example, black) plane.

If the digitized image has been converted from continuous tone picture elements to halftone picture elements, the halftone picture elements will be referred to herein as pels and their color component values referred to as ink-density values. As with pixels, a different value is associated with each different one of the image's color planes for each pel, and the number of color planes in the halftone representation may be greater than the number of color planes in the digitized image. Thus, the digitized image and the copy printed from the halftone image (the printed copy) are two distinct, but related, representations of the same physical image.

Herein the word halftone will be taken to mean that gradations from light to dark in pels that are obtained by the relative darkness and density of tiny dots of inks that are to be applied to paper or other substrate material. Also, if the digitized image is a color image, its pixel values are ordinarily the relative brightness values of additive radiant primary colors, such as those of a computer's display. Therefore, the halftone conversion process as referred to herein also includes conversion of the pixel values of radiant primary colors into the pel values of light absorbing primary colors (for example, Cyan, Magenta, Yellow and Black ink densities) that are needed for printing. The halftone image then may be printed on paper or other substrate material; such printed image is herein called a printed copy.

Whenever reference is made herein to color planes, it is understood to include any number of color planes used by a particular image's digitizing technique to define the pixel's or pel's color characteristics. Pixel values, as well as pel values, have a magnitude represented by at least one binary digit or bit.

Whenever reference is made herein to ink or ink-density value, it is understood to refer to any substance that is used to apply color to paper or other substrate material, be that substance ink, dye, toner or other. Further, ink-density values range from 0% to 100%, meaning from no ink applied to the area of a picture element [pel] on paper up to total coverage of that area on paper.

A high-speed digital printer accepts a first stream of digitized images, called source images, each source image representing a specific page to be printed, and converts those digitized images into printed copies by depositing dots of black or colored inks onto paper. The spatial density and positions of the dots of ink on the printed copies are directly related to and defined by the numerical values of the digitized image pixels. The source of paper or other substrate material used in high-speed printers may be either cut sheets or a continuous seamless web of paper unrolled as needed from a large roll.

To effect comparison of a digitized source image (which is herein stipulated to be a perfect representation of what is intended to be printed) with a scanned image created by scanning a printed copy of the source image requires common features within the two images to be positionally aligned. Prior art exists for aligning and comparing two images. In the prior art, the two images are positionally aligned either by semi-automated or fully automated methods. The alignment methods uses distinct common features within both images to effect positional alignment of all, or segmented parts of, the two images. Three examples of prior art are:

1. Braudaway, G., "Recovering Invisible Image Watermarks from Images Distorted by the 'Stirmark' Algorithm," Proceedings of the IS&T PICS Conference, Apr. 25-28, 1999, pp. 307-310;
2. Braudaway, G. And Mintzer, F., "Automatic recovery of invisible image watermarks from geometrically distorted images," Journal of Electronic Imaging, October 2000, Volume 9(4), pp. 477-483; and
3. "RECOVERING AN INVISIBLE DIGITAL IMAGE FROM A DISTORTED IMAGE REPLICA," U.S. Pat. No. 6,571,021, issued May 23, 2003.

These three examples of prior art are herein incorporated by reference in their entirety and for all purposes.

PROBLEMS WITH THE PRIOR ART

A first category of printing defects, called significant defects, are defects that could cause misinterpretation of a single printed character by a human reader. A significant defect is herein defined to be one of two types, 1) either a small square area having black pel values in the first-stream image that are not found in corresponding pel values of the printed copy, or 2) ink or other marking detected in pel values of the printed copy where corresponding pel values of the first-stream are white. Further, to be a significant defect, that is, to potentially cause misinterpretation by a human reader, the unexpected small square of either type must be in the near proximity of a character of text that is intended to be printed. An example small square is 0.01 inches on a side, and an example near proximity is 0.04 inches in any direction. Either of the two types of significant defects constitute a printing error, and the page on which it is detected is recorded in an error log of defective pages.

A second category of printing defects, called cosmetic defects, are defects that would probably not cause misinterpretation of a single printed character by a human reader but are still objectionable in the printed copy. Cosmetic defects include stains on the paper, unintended printed streaks and the like. Cosmetic defects, based on their size and frequency of occurrence, may constitute printing errors, and if judged so, the pages on which they are detected are also recorded in an error log of defective pages.

An example anticipated application of the cited prior art is to the verification of a mortgage loan commitment letter sent by a bank to a mortgagee for signature. The bank creates the letter, containing an identifying loan application number, as a printed copy of a digitized source image, sends the letter to the mortgagee, and retains the digitized source image for later verification of the returned letter. The returned letter is matched to the retained source image using the embedded identifying loan application number (usually by human inspection) and is scanned to produce a scanned image. The scanned image is automatically aligned with the source image using three or more corresponding common features of the two images, according to the methods taught in the prior art of References 2 and 3.

A single composite color image is formed from the two digitized images, the source image and the aligned scanned image, with the red color plane made exclusively from pixels of the source image and the blue and green planes made identically and exclusively from pixels of the aligned scanned image. The composite color image is displayed on a CRT display for human observation. If the scanned image is aligned perfectly with the source image, a monochrome black-white image will result. If alignment is imperfect, cyan and red fringes will appear around the black text on the white surround in the composite image. More importantly, when displayed to a human viewer, gross differences, such as an expected signature or unexpected additions, modifications or deletions of text will show as conspicuous red or cyan features in the composite image, and a human decision can be made to accept the signed letter or to forward an obviously modified letter to the bank's fraud control department for further analysis.

Significant unsolved problems become evident when attempting to adapt the cited prior art to high speed digital printing. Firstly, positional alignment of common features found within two images requires selection of a source image that corresponds to the candidate scanned image to be accomplished by some independent means. The most commonly used independent means requires a human being to view and recognize a common embedded feature, such as a loan application number, the inclusion of which may be unallowable in other applications. Secondly, the need to automatically match a stream of source images with many sequentially printed copies of each of those source images, and simultaneously, to identify the place in the sequence where each defective printed copy lies has not been anticipated. Thirdly, although adequate for the purposes stated in the prior art and for the example verification of a mortgage commitment letter, the accuracy of alignment achievable using the prior art is insufficient to meet the requirements for automated high precision printing verification. As in the example given, the feature size allowable for undetected defects must be smaller than a square having 0.01 inch sides or have feature proximity greater than 0.04 inches in any direction from a readable character of text. For printed copies on paper, these tolerances can not be met using methods taught in the prior art. To compensate for the poor dimensional stability of paper, meeting the tolerances requires page by page, line by line, and pixel (pel) by pixel (pel) alignment beyond their capabilities. Thus, the required accuracy creates a need for an additional and unanticipated method of fine alignment.

ASPECTS OF THE INVENTION

An aspect of the present invention is an improved system and method for detecting defects in a printed copy.

An aspect of the present invention is an improved system and method for explicit detection and logging of significant and cosmetic defects in a printed copy.

SUMMARY OF THE INVENTION

A first stream of digitized images (sources images) is received by a computer system. The source stream is printed to create one or more printed copies. Print verification is done by scanning the printed copies, thereby forming a second stream of digitized images of the specific pages. Digitized images from the second stream are then spatially aligned in a preferred embodiment page by page, line by line and pixel (pel) by pixel (pel) with corresponding digitized images from the first stream. Once pairs of corresponding pages are aligned, one image from the first stream, called a first-stream image, and a corresponding image from the second stream, called a second-stream image, the pixel values of the second-stream image are, in a preferred embodiment, converted to pel values that have same number of bits (e.g., one-bit) as the corresponding pel values in the source image. The aligned image lines of both the first-stream and second-stream images, now both having a same number pel values (e.g., one-bit) per pel, are compared to find pel sequences that are different. These differences represent defects in the printed page.

BRIEF DESCRIPTION OF THE DRAWINGS

These and other aspects, features, and advantages of the present invention will become apparent upon further consideration of the following detailed description of the invention when read in conjunction with the drawing figures, in which:

FIG. 8 is a flow chart of a process for course image alignment.

FIG. 9 is a flow chart of a sub-process for fine image alignment.

FIG. 10 is a flow chart of a sub-process for comparison of a printed copy with a source image.

DETAILED DESCRIPTION OF THE INVENTION

The invention described herein specifies improved techniques for verifying the quality of a printed copy. Herein, verifying the quality of a printed copy is taken to mean determining the presence of ink intended to have been applied to the printed copy, and determining the absence of unintended coloration, be it from ink or other source, on the printed copy.

The preferred embodiment of the present invention will use a roll-fed paper web. Those skilled in the art will understand that the concepts of the present invention are easily adaptable to sheet fed printers as well, and to substrate materials other than paper.

Figure 1:
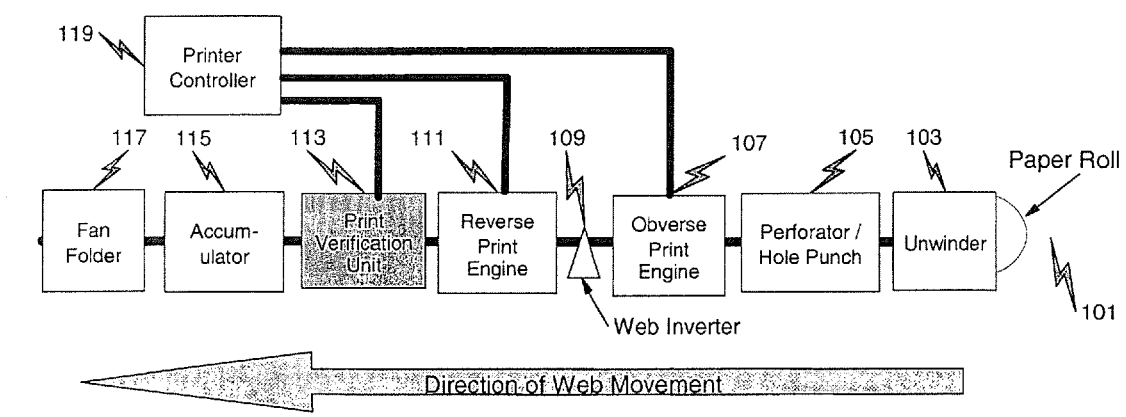
FIG. 1 shows a functional block diagram of an example high-speed printer train using the present invention.

An example high-speed printer is shown in FIG. 1. Referring to FIG. 1, the units (101) through (117) are collectively referred to as the printer or print-train. The units of the print-train, although physically separate, are threaded with a common continuous strip of paper, called a web. One of the physically separate units is designated as the Master in terms of establishing the speed of the web, and all other units in the train independently synchronize their speeds with that of the Master by sensing tension in the paper web.

In the example, well known print-train, the web is presented as roll of paper (101) nineteen inches wide and 40,000 to 50,000 feet in length, depending on paper thickness. Commonly available paper rolls are fifty inches in diameter with a six inch core. The paper roll is mounted into a servomotor controlled Unwinder unit (103) that unwinds and supplies the web to the print train at a web speed determined by a Master unit. In the example print-train, the Obverse Print Engine (107) is designated as the Master for web speed purposes. In a preferred embodiment, the continuous web is perforated into eleven inch web-segments, and guide holes are punched into tear-strips at each edge of the web by the Perforator/Hole Punch unit (105). Other web-segments are envisioned (e.g., for metric standards, drawing formats, etc.) Two 8½" by 11" page impressions, each defined by a source image, are printed on the obverse side of each web segment by the Obverse Print Engine (107). The web is physically inverted by the Web Inverter unit (109) and passes into the Reverse Print Engine (111). Two additional page impressions are printed on the reverse side of the web by the Reverse Print Engine. The four impressions printed on each web segment are logically oriented and sequenced by the Printer Controller (119) before being sent to the Obverse and Reverse Print Engines so pages in a final multi-page document will be in the correct order.

The web then passes through a novel Print Verification Unit (113) where both the obverse and reverse sides of the web are scanned to produce two streams of digitized images, each called second-stream images, one second stream image from the top (reverse) and one second stream image from the bottom (obverse) of the web. These second-stream images are to be aligned with and compared to corresponding first-stream images to find small areas that are different, called defects.

The web continues on into the well known Accumulator unit (115) and Fan Folder unit (117). The Accumulator unit is a mechanical web buffer that can accumulate a significant length of the web from its continuous input with no output before it must signal a web stop. The Accumulator unit facilitates brief intermittent downstream web stopping by the Fan Folder unit, as it separates and delivers a fan-folded document or short sequence of documents onto a conveyor, and then at a variable speed resumes folding the pages of the next document on the web. The documents are fan-folded and separated using the web perforations created by the Perforator/Hole Punch unit (105). The example print-train can produce in excess of 200 page impressions (50 perforated web segments) per minute.

Figure 1A:
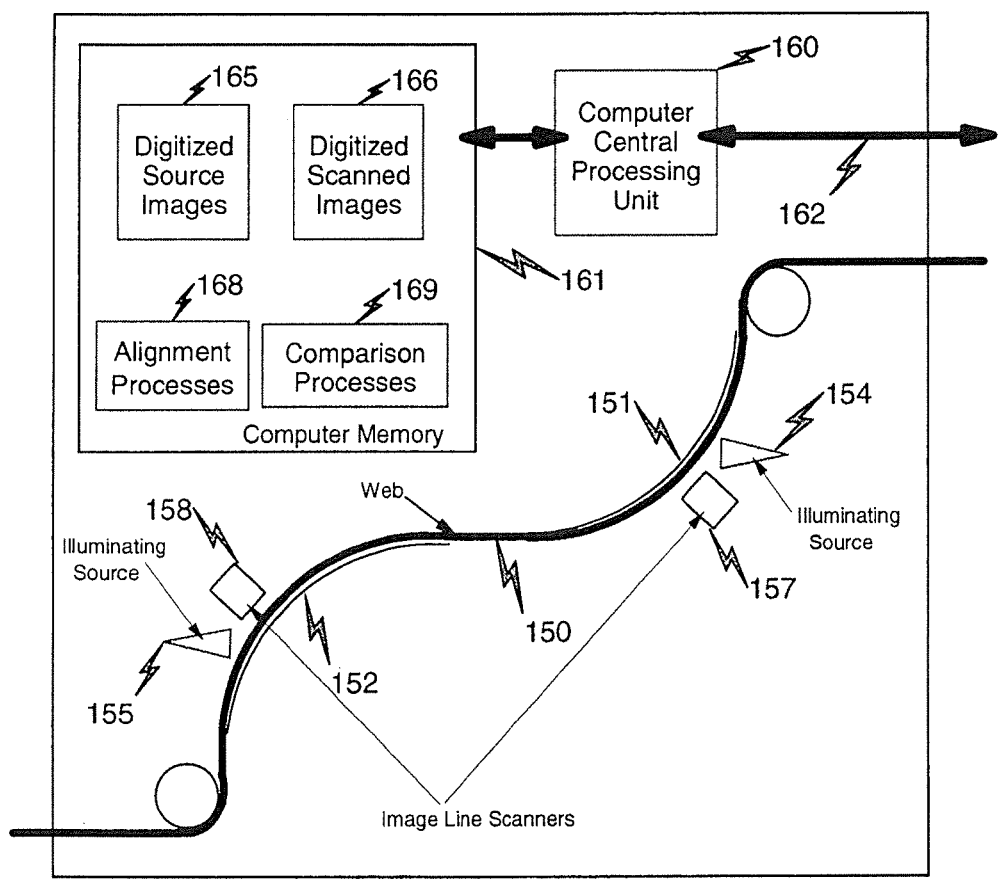
FIG. 1A is a block diagram of one preferred embodiment of the Print Verification Unit of the present system.

FIG. 1a shows a block diagram of one preferred embodiment of the Print Verification Unit. The paper web (150) is threaded through the unit and passes over two curved platens, (151) and (152). The web is illuminated by two sources (154) and (155) as it passes over the two platens. Tension in the wed is controlled to keep the web in physical contact with the platens so the two linear image scanning arrays (157) and (158) can maintain a fixed focus on the web surface. Image scanning array (157) scans and samples the obverse side of the web to produces sequential lines of pixels that are grouped into scanned images, and image scanning array (158) does the same for the reverse side of the web.

The Print Verification Unit contains a digital computer composed of a Central Processing Unit (160), an associated memory (161), and an input/output interface (162) used for communication with the Printer Controller [FIG. 1, (119)]. A first stream of digitized source images are received via the input/output interface (162) and stored in the computer memory (165). The scanned image lines produced by the two linear image scanning arrays (157) and (158) are organized into two streams of digitized scanned images and are also stored in the computer memory (166). Computer processes that perform source image to scanned image alignment (168) and processes that perform page by page, line by line and pel by pel comparison of corresponding source and scanned images (169) are also stored in the computer memory. Defects found in the printed copies (determined by processing the streams of scanned images) are reported to the Printer Controller via the input/output interface (162).

Coarse Alignment of Images of the First and Second Streams

In a preferred embodiment, spatial alignment of digitized images from the second stream with those of the first stream is accomplished in two phases, a coarse alignment phase and fine alignment phase. The objective of coarse alignment is to locate lines in the second stream that correspond to lines in the first stream. In a preferred embodiment, this is facilitated by a linear reference markers, called synchronization-strips, that are added to all digitized source images. In the preferred embodiment, synchronization-strips are positioned to be printed in the left and right sacrificial margins and the center gutter [between page impressions] of the web. The margins are sacrificial in that they are trimmed off after the final document is bound, and the center gutter of the web is not visible after binding unless the bound document is disassembled. Use of synchronization-strips is one of the more significant aspects of the present invention.

Figure 2:
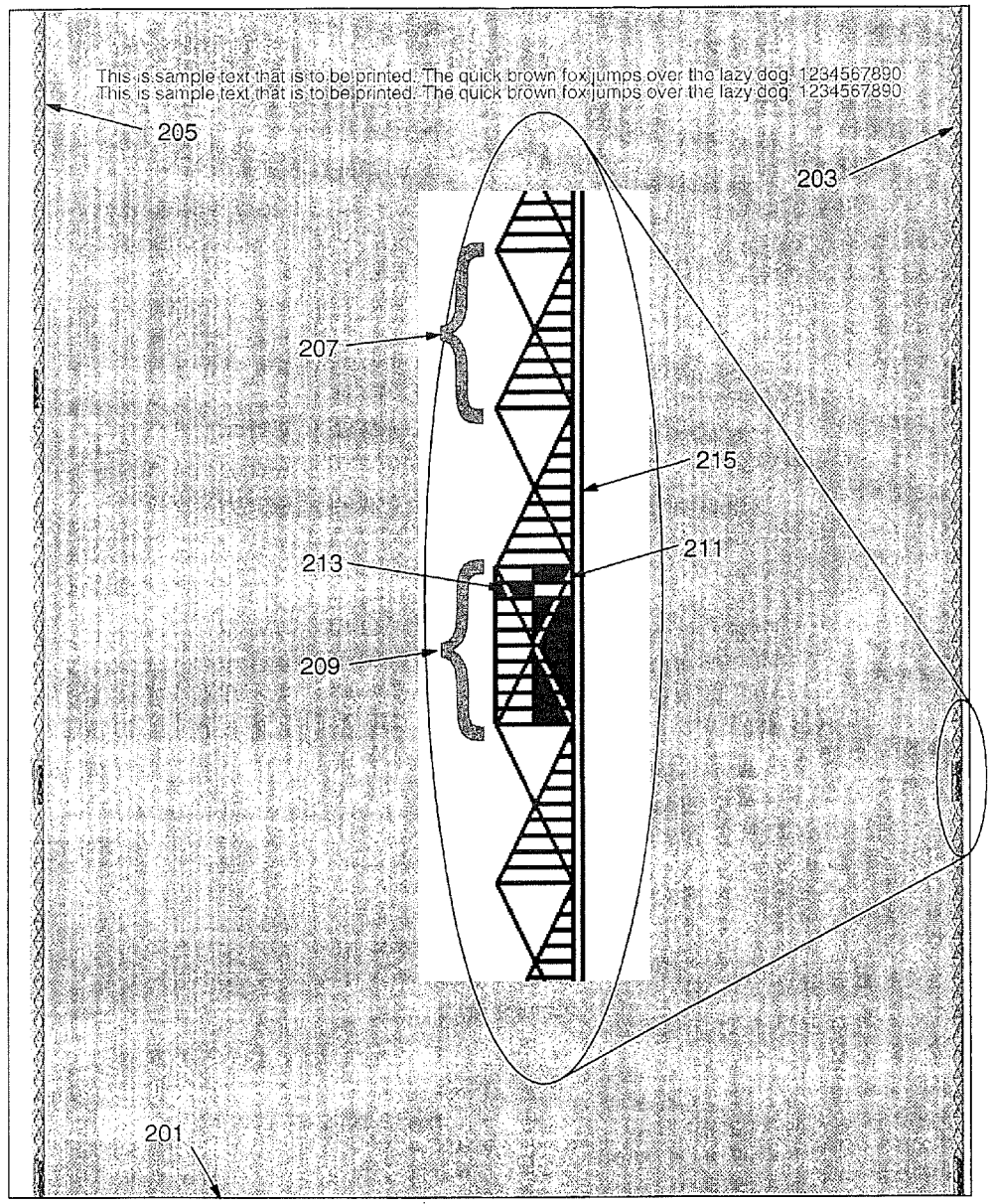
FIG. 2 shows the format and placement of synchronization-strips, in one preferred embodiment, that are included in all source-images to be printed on all web segments—A section of the synchronization-strip is enlarged to show its detail.

Referring to FIG. 2, the outlined rectangle (201) represents the edges of a printed-copy [one page impression]. Lines of the printed-copy lie horizontally across the printed-copy as shown and also across the paper web. In the example embodiment, two printed-copies, each a document page, lie side-by-side on each side of each web segment. An example synchronization-strip, aligned vertically and along the web is printed at the trim edge (203) and at the bound edge (205) of the printed-copy. FIG. 2 shows only the right half of a web segment; a second printed-copy lies to the left, and the two printed-copies share a common center gutter synchronization-strip (205). An enlargement of the synchronization-strip shows a basic pattern, delineated by a brace (207), that is repeated along the edges of the source image every 100 lines. At defined intervals in the synchronization-strip the basic pattern is replaced by a counter pattern, delineated by a second brace (209). In the present example, the counter pattern represents a ten-bit binary counter. Three counter patterns are placed in the synchronization-strips along the web edges and center gutter of every web segment. Concatenating bits of the three counter patterns yields a thirty-bit binary counter. The filled square in the counter pattern lying rightmost (211) represents a zero for that particular bit in the counter and a filled square in the counter pattern lying leftmost (213) represents a one. Thus, if the enlarged counter pattern is the second of three patterns, and if the filled squares in the first and third patterns are all zeros, the 30-bit binary number represented by the three concatenated segments is:

0000000000,0000000010,0000000000 or $2^{11}$, which, as a decimal number is 2048. With the 30-bit binary number, a range of equivalent decimal numbers from 0 to 1,073,741,823 can be represented. The thirty bit counter, incremented for every first-stream digitized image, can thus serve as a unique page counter for a large number of documents having a large number of pages before it recycles.

The synchronization-strips that are embedded into the first-stream digitized images will, when printed, exist in printed copies, and when the printed copies are scanned by the Print Verification Unit (FIG. 1, (113)), the synchronization-strips will also exist in the second-stream digitized images. Coarse alignment of corresponding images of the first stream and second stream relies on matching the patterns in the synchronization-strips to within a fraction of a line width and a fraction of a pel position.

Images in the second stream, produced by scanning the printed web segments, often have fewer lines per inch than do images in the first stream. For example, digitized images in the first stream may have 600 lines per inch while scanned images in the second stream may have only 250 lines per inch. Thus, to be able to match images of the two streams line by line, additional lines of the second image must be created between the available scanned lines using interpolation methods. Conversely, images of the first stream could be reduced to have 250 lines per inch using any of many image reduction methods known to those skilled in the art. The preferred embodiment, however, is to enlarge images in the second stream by interpolation, when needed.

To facilitate interpolation between the scanned lines of images in the second stream, each scanned line of every web segment is tagged with three tag-pairs, each determined by the independent tracking of the left, center and right synchronization-strip. The term tracking as used herein refers to the numeric evaluation of horizontal and vertical coordinates of sequential and specifically identifiable features in the synchronization-strips embedded in the digitized scanned images, and relating those values to known numeric values of horizontal and vertical coordinates of the same sequential and specifically identifiable features embedded in the corresponding source image. An example embodiment of a tracker uses localized application of a two-dimensional cross-correlation function, repeatedly and sequentially applied, to determine the values of horizontal and vertical coordinates of the features in the digitized scanned images, with linear interpolation of the coordinate values between applications. Those skilled in the art will recognize that the tracking method can be embodied in a number of functionally equivalent ways that produce the same or equivalent results.

The second number of each of the tag-pairs is the closest matching line number of a line in a corresponding digitized image in the first stream. If the scanning element of the Print Verification Unit (115) is perfectly aligned at right angle to the web, and if the paper is not physically warped or skewed, these three numbers will be the same. However, in most instances the three numbers will not be the same because of scanning element misalignment and paper warpage and skew. For the example pixel and pel resolutions, line 250 of a scanned image could have three tag pairs with the different second numbers, such as {..., 600.28}, {..., 598.85}, and {..., 599.65}.

Again using the previous example, digitized images in the first stream have 600 pels per inch within each line, while digitized images in the second stream have only 250 pixels per inch within each line. To be able to closely match individual pel to pel positions within corresponding pairs of images in the two streams, additional pixels in the lines of the second image must also be created using interpolation. Thus the interpolation method needed is a two-dimensional method capable of interpolating between available lines to produce intermediate lines and interpolating between available pixels in those lines to produce intermediate pixel values.

As an aid to interpolation between pixel values, each synchronization-strip contains a lone vertical mark (215). The pixel positions of the three vertical marks in lines of the scanned images of the second stream are also tracked, and the pixel position of each of the three is recorded as the first number in its appropriate tag-pair. The first and second number in a tag-pair are, therefore, 1) the horizontal coordinate (pixel position across the web) of the appropriate lone vertical mark within the scanned line, and 2) the closest matching line number of a line in a corresponding source image in the first stream, each specified to a fraction of a pixel or fraction of a line. The three tag-pairs for each scanned line will be denoted as $P(u_1^*,y_1^*)$, $P(u_2^*,y_2^*)$ and $P(u_3^*,y_3^*)$.

As an example, for a 19 inch web and source images having 600 pels per inch, pel positions of the three lone vertical marks in the three synchronization-strips, denoted as $Y_1$, $Y_2$, and $Y_3$, could be positions 70, 5730 and 11390, and by design would remain at those specified pel positions for every web-segment. The three tracked lone vertical marks in the scanned image at the particular scanned line 250 might be 39.17, 2392.50 and 4755.83. The particular scanned line number is designated as L. The three complete tag-pairs for L=250 of the scanned images would therefore be {39.17, 600.28}, {2392.50, 598.85}, and {4755.83, 599.65}. The line number of scanned image lines, the three tag-pairs for each of those scanned lines, and the specified locations of the three lone vertical marks in the three synchronization-strips of the source images are the necessary prerequisites for the required two-dimensional (horizontal and vertical) pixel interpolation.

Figure 3:
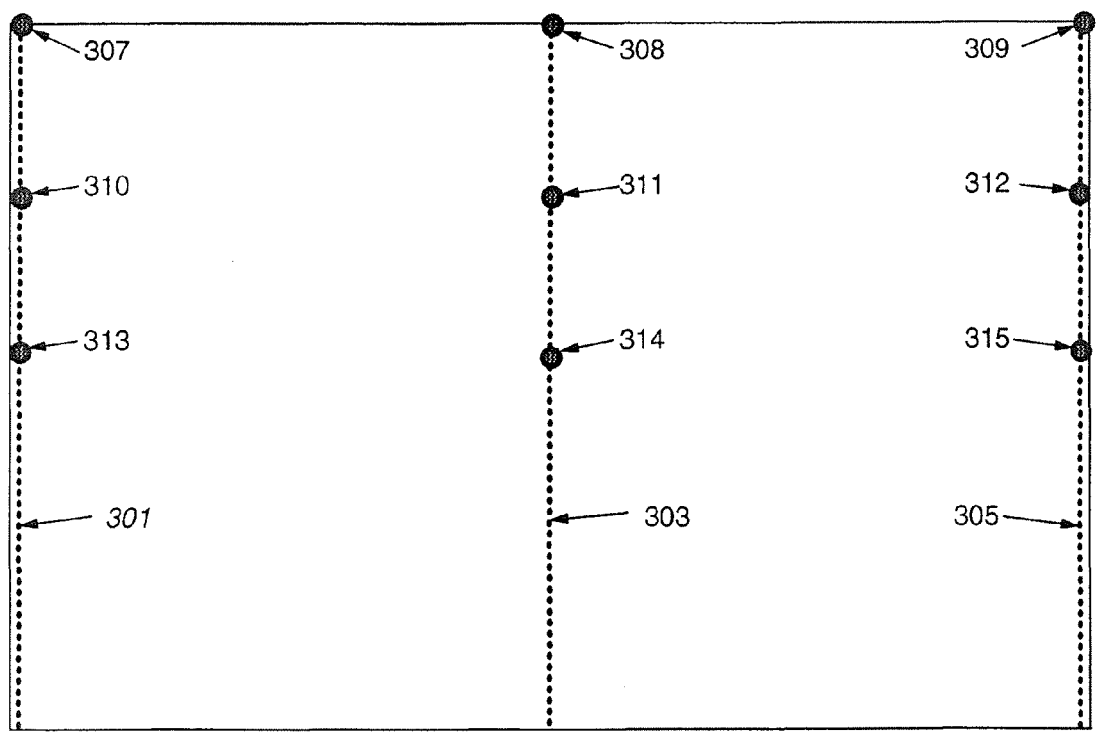
FIG. 3 shows a perforated web segment as it would appear had it been printed from by an ideal printer on ideal paper.
Figure 4:
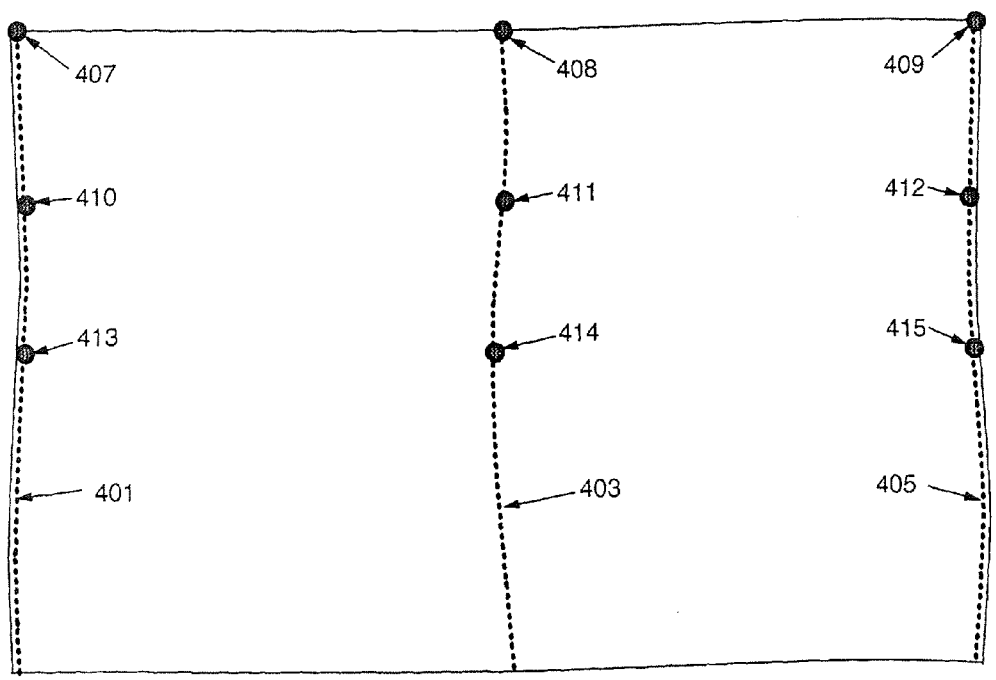
FIG. 4 shows a perforated web segment as it would appear had it been printed by a typical printer on typical paper, with the resulting distortion exaggerated for illustrative purposes.

Referring to FIG. 3 and FIG. 4, and for the example print train, web segments are 19 inches wide and 11 inches high. FIG. 3 shows a perforated web segment as it would appear if it could be printed as specified by an ideal printer on ideal paper; it would be a physical embodiment of the digitized source images and synchronization-strips without defect. The three synchronization-strips (301), (303), and (305) are shown as they would appear in the vertical direction, parallel to edges of the web. FIG. 4 shows a perforated web segment as it would appear when printed by a typical printer on typical paper and redigitized by scanning to form a scanned image. The resulting spatial distortions are exaggerated for illustrative purposes. The three corresponding synchronization-strips are (401), (403), and (405).

In the preferred embodiment, six coordinate-pairs from each image in the first stream and six coordinate-pairs from a corresponding image in the second stream are used for coarse alignment of a strip of the web. The six coordinate-pairs chosen are numbered sequentially (307) through (312) for the source image and (407) through (412) for the corresponding scanned image. An example height of the strip is one inch, or 600 lines of the source image. The coordinate-pair values are referred to herein as $(x_i,y_i)$ for the source image, and $(u_i,v_i)$ for the scanned image, for $1 \leq i \leq 6$, which, for the first strip, correspond to (307) through (312) and (407) through (412). The values of coordinate-pairs and their relationship to a line number of a scanned image line, the three tag-pairs associated with that scanned line, and the specified locations of the three lone vertical marks in the three synchronization-strips of the source images can best be shown by the following example. Considering the coordinate-pairs (310), (311) and (312) and corresponding coordinate-pairs (410), (411) and (412), and, as before, using scanned line 250 as an example, the three corresponding coordinate-pair values would be:

$(x_4,y_4)=(V_1,y_1^*)=(70, 600.28)$, and $(u_4,v_4)=(u_1^*,L)=(39.17, 250)$ $(x_5,y_5)=(V_2,y_2^*)=(5730, 598.85)$, and $(u_5,v_5)=(u_2^*,L)=(2392.50, 250)$ $(x_6,y_6)=(V_3,y_3^*)=(11390, 599.65)$, and $(u_6,v_6)=(u_3^*,L)=(4755.83, 250)$ If $(u_i,v_i)$ are the horizontal and vertical coordinate pair of pixels in the scanned image, and $(x_i,y_i)$ are the horizontal and vertical coordinate pair of pels in the source image, the two can be related by an affine transformation. In matrix equation form, the affine transformation is:

$$\begin{bmatrix} u_i \\ v_i \end{bmatrix} = \begin{bmatrix} U_x & U_y \\ V_x & V_y \end{bmatrix} \begin{bmatrix} x_i \\ y_i \end{bmatrix} + \begin{bmatrix} U_c \\ V_c \end{bmatrix} \quad (1)$$

where the coefficient $\{U_x,U_y,U_c,V_x,V_y,V_c\}$ are constants. Equation (1) can be expanded and rewritten in terms of four coordinate-pairs from the source image (307),(308),(310),(311) and the four corresponding coordinate-pairs from the scanned image (407),(408),(410),(411) as Equation (2).

$$\begin{bmatrix} u_1 \\ v_1 \\ u_2 \\ v_2 \\ u_4 \\ v_4 \\ u_5 \\ v_5 \end{bmatrix} = \begin{bmatrix} x_1 & y_1 & 1 & 0 & 0 & 0 \\ 0 & 0 & 0 & x_1 & y_1 & 1 \\ x_2 & y_2 & 1 & 0 & 0 & 0 \\ 0 & 0 & 0 & x_2 & y_2 & 1 \\ x_4 & y_4 & 1 & 0 & 0 & 0 \\ 0 & 0 & 0 & x_4 & y_4 & 1 \\ x_5 & y_5 & 1 & 0 & 0 & 0 \\ 0 & 0 & 0 & x_5 & y_5 & 1 \end{bmatrix} \begin{bmatrix} U_x \\ U_y \\ U_c \\ V_x \\ V_y \\ V_c \end{bmatrix} = X \begin{bmatrix} U_x \\ U_y \\ U_c \\ V_x \\ V_y \\ V_c \end{bmatrix} \quad (2)$$

Equation (2) is mathematically over-determined, needing only three corresponding coordinate-pairs instead of four, but Equation (2) as stated can be solved in a least-squares sense to give a first-instance of the coefficients $\{U_x,U_y,U_c,V_x,V_y,V_c\}$, as shown in Equation (3).

$$\begin{bmatrix} U_x \\ U_y \\ U_c \\ V_x \\ V_y \\ V_c \end{bmatrix} = (X^T X)^{-1} X^T \begin{bmatrix} u_1 \\ v_1 \\ u_2 \\ v_2 \\ u_4 \\ v_4 \\ u_5 \\ v_5 \end{bmatrix} \quad (3)$$

In the notation of Equation (3), the superscript T when applied to a matrix is taken to mean the transpose of that matrix, and the superscript −1 is taken to mean the inverse of that matrix.

The positions of the scanned pixels contained in the quadrilateral having apexes (407),(408),(410),(411) relative to the positions of the source image pels contained in the rectangle having apexes (307),(308),(310),(311) are determined using Equation (1), with application the first-instance of the coefficients $\{U_x,U_y,U_c,V_x,V_y,V_c\}$. If the scanned image has fewer lines per inch and fewer pixels per inch in each line than the source image, as it does in the example embodiment, the affine transform of Equation (1) determines the two-dimensional coarsely aligned positions of the interpolated pixels, called herein points of interest.

In the preferred embodiment, the interpolated pixel brightness values at the points of interest are determine by linear area interpolation in the two-dimensional u:v plane. A small square sub-area of the u:v plane [which is the plane of the scanned image] is isolated using the integer parts of the point of interest. For example, if the interpolated coordinates (u,v) are (1303.297,457.338), the point of interest is surrounded by the four pixel locations (1303,457), (1304,457), (1303,458) and (1304,458), and those four pixel locations, herein called vertices, define the square sub-area of interest. The fractional parts the coordinates $\{u,v\}$ are called the residuals, $(u_R,v_R)$, and are numerically (0.297,0.338).

Linear interpolation in the sub-area begins by dividing the square into two triangular areas along a diagonal. The two triangular areas are herein called trihedrons. For example, of the two choices available for dividing the square, the upper-left to lower-right diagonal connecting vertices (1303,457) and (1304,458) is chosen. Then the trihedron in which the point of interest lies is determined. The criterion for selection is obvious: if $u_R \geq v_R$, the upper-right trihedron is chosen because it will completely enclose the point of interest; otherwise, if $u_R < v_R$, the lower-left trihedron is chosen. If the point of interest lies on the diagonal, $u_R = v_R$, either trihedron will do, since both will produce the same numeric result.

Interpolation within the trihedron can be defined in terms of the natural coordinates of the point of interest. Natural coordinated have a very useful property in that they all lie in the domain (0,1) for all points within or on the boundary of the trihedron. In other words, all of the natural coordinates will be the in domain (0,1) for every interpolated point of interest, and at least one will not be in the domain for every extrapolated point of interest.

Interpolation within a trihedron can be defined in terms of the natural coordinates, $a_i$, of a point of interest as:

$$f(u_R, v_R) = a_A f(u_A, v_A) + a_B f(u_B, v_B) + a_C f(u_C, v_C), \quad (4)$$

where $$\sum_{i=A,B,C} a_i = 1$$

The rectangular coordinates of the vertices are denoted as $(u_i,v_i)$. The dependent variables at the vertices, which in the example are the pixel brightness values, are denoted as the functions $f(u_i,v_i)$. A further side condition is that the natural coordinates must sum to one. Expressing this relationship in matrix form:

$$[f(u_R, v_R)] = [f(u_A, v_A) \quad f(u_B, v_B) \quad f(u_C, v_C)] \begin{bmatrix} a_A \\ a_B \\ a_B \end{bmatrix} \quad (5)$$

Based on the same natural coordinates, the coordinates of the point of interest can be written in terms of the rectangular coordinates of the vertices, as $$\begin{bmatrix} u_R \\ v_R \\ 1 \end{bmatrix} = \begin{bmatrix} u_A & u_B & u_C \\ v_A & v_B & v_C \\ 1 & 1 & 1 \end{bmatrix} \begin{bmatrix} a_A \\ a_B \\ a_B \end{bmatrix} \quad (6)$$

It is now possible to solve for the natural coordinates in terms of the rectangular coordinates of the vertices, as $$\begin{bmatrix} a_A \\ a_B \\ a_B \end{bmatrix} = \begin{bmatrix} u_A & u_B & u_C \\ v_A & v_B & v_C \\ 1 & 1 & 1 \end{bmatrix}^{-1} \begin{bmatrix} u_R \\ v_R \\ 1 \end{bmatrix} \quad (7)$$

Substituting for the natural coordinates, the interpolation equation can be written as $$[f(u_R, v_R)] = \quad (8)$$
$$[f(u_A, v_A) \;\; f(u_B, v_B) \;\; f(u_C, v_C)] \begin{bmatrix} u_A & u_B & u_C \\ v_A & v_B & v_C \\ 1 & 1 & 1 \end{bmatrix}^{-1} \begin{bmatrix} u_R \\ v_R \\ 1 \end{bmatrix}$$

For the example interpolation, the independent values $u_R$ and $v_R$ are 0.297 and 0.338, respectively. Because $u_R$ is less than $v_R$, the lower-left trihedron having vertices (1,1), (0,1) and (0,0) is chosen. The natural coordinates are computed as:

$$\begin{bmatrix} a_A \\ a_B \\ a_B \end{bmatrix} = \begin{bmatrix} 1 & 0 & 0 \\ 1 & 1 & 0 \\ 1 & 1 & 1 \end{bmatrix}^{-1} \begin{bmatrix} 0.297 \\ 0.338 \\ 1 \end{bmatrix} \quad (9)$$
$$= \begin{bmatrix} 1 & 0 & 0 \\ -1 & 1 & 0 \\ 0 & -1 & 1 \end{bmatrix} \begin{bmatrix} 0.297 \\ 0.338 \\ 1 \end{bmatrix}$$
$$= \begin{bmatrix} 0.297 \\ 0.041 \\ 0.662 \end{bmatrix}$$

All of the natural coordinates are positive and in the domain (0, 1), and their sum is 1.0, as expected.

It is worth noting in passing that since the sub-area of interest will always be a unit square having edges of unit length, the coordinates of its vertices will always be zeros or ones. Because of that, the inverse of the matrix of coordinates can have only values of 1, 0, and −1 for its elements. Thus, the natural coordinates can always be computed without multiplication, using only addition and subtraction.

Construction of a coarsely aligned replacement for a section of the scanned image can now be completed. The entire coarsely aligned replacement of the scanned image, including this first section and all other sections, will be referred to herein as the initial replacement image. For every pel location in or on the boundary of the rectangle defined by the four coordinate-pairs from the source image (307),(308),(310), (311), a point of interest is computed using Equation (1) applying the first instance of the coefficients $\{U_x,U_y,U_c,V_x, V_y,V_c\}$. At each point of interest, a pixel brightness value is interpolated using Equation (8), also applying the first instance of the coefficients $\{U_x,U_y,U_c,V_x,V_y,V_c\}$. The interpolated pixel brightness value is placed into an array of pixel brightness values that have a one-to-one positional correspondence with the source image pel location used to evaluate the point of interest. In this manner a section of the initial replacement image is constructed that has the same number of lines and pixels per line as the source image rectangle, and it is placed in the same location in the initial replacement image as the section bounded by the four coordinate-pairs (307), (308),(310),(311) has in the source image. In the preferred embodiment, the interpolated pixel brightness values are binarized, that is, they are converted to one of two values and represented by a single binary bit. The criterion used for binarization in the preferred embodiment is simple thresholding; if the pixel brightness value is less than a threshold value it is set to 1; otherwise, it is set to 0. An example threshold value is 50% of the maximum brightness value. Once binarized, the pixel is referred to as a pel. A binarized pixel value is a special case of a halftoned pel value. Halftoned pel values can be represented by more than one bit; binarized pel values are represented by a single bit.

Construction of the remaining sections of the initial replacement image is continued using the next groups of four coordinate-pairs from the source image (308),(309),(311), (312) and the group of four corresponding coordinate-pairs from the scanned image (408),(409),(411),(412) to produce a second instance of the coefficients $\{U_x,U_y,U_c,V_x,V_y,V_c\}$. The section of the source image bounded by the four coordinate-pairs (308),(309),(311),(312) is constructed in like manner as hereinabove by applying the second instance of the coefficients $\{U_x,U_y,V_c,V_x,V_y,V_c\}$. This completes construction of the first strip of the initial replacement image.

A second strip is defined by six coordinate-pairs chosen numbered sequentially (310) through (315) from the source image and (410) through (415) from the corresponding scanned image. The process of constructing a second strip of the initial replacement image is completed in a like manner as for the first strip. Additional strips are constructed in like manner until all strips of the first web segment are completed. Then the process defined for the first web segment is repeated for every subsequent web segment until the entire document is completed, and then repeated as many times as necessary for all document copies that define a printing job.

A flow chart of an example coarse image alignment process is shown in FIG. 8. Referring to FIG. 8, the digitized images of all pages to be printed are supplied in page sequential order (801). A process in the printer controller [FIG. 1, (119)] groups the pages into logical image pairs. By logical image pairs it is meant, for example, that if the final document is to have 100 pages and is to be bound so that pages 50 and 51, printed on the obverse side of the web, face each other, then page numbers 2 and 99 form a left-right logical image pair and are the first logical image pair directed to the obverse print engine, and page numbers 100 and 1 form a second left-right logical image pair and are the first logical image pair directed to the reverse print engine. The printer controller process also embeds three synchronization-strips into the left margin, right margin and center gutter of all logical image pairs, thus forming marked image pairs (803).

The first marked image pair is selected for each print engine and represent image pairs that will be printed back-to-back on the web (805). The marked image pairs are printed (807) and scanned (809) in the Print Verification Unit [FIG. 1a, (157) and (158)] forming an obverse scanned image pair and a reverse scanned image pair. The horizontal and vertical positions of features within the synchronization-strips are tracked using pixel values from the scanned images (811). The purpose of tracking is to establish positional synchronization with the appropriate marked image pair.

Process steps from (813) through (827) apply to the obverse print engine and the obverse side of the web; a procedurally identical process applies to the reverse print engine and the reverse side of the web. Therefore, process steps (813) through (827) are executed simultaneously and in parallel for the obverse and reverse sides of the web. The parallel processes merge at step (829).

Images in the scanned image pair and the corresponding marked image pair are separated into right and left images, and the left images are selected (813). The selected marked image and scanned image are divided into corresponding horizontal strips based on tracked vertical synchronization-strip positions, and the first horizontal strips, one from each image, are chosen (815).

An affine transforms is evaluated based on the tracked horizontal positions of the synchronization-strips in the top and bottom lines of the chosen horizontal strip (817). The affine transform is, in turn, used to evaluate points of interest in the scanned image strip that correspond to each and every pel location in the marked image strip (819), and a pixel value is interpolated at each point of interest in the scanned image (821).

Each interpolated pixel value is placed into an appropriate left or right initial replacement image pair at the coordinates of the marked image pel location that created the point of interest used for its interpolation (823). In this manner, the scanned image (left or right, whichever is being processed on the particular pass through the process) is increased in size horizontally and vertically, and the interpolated pixels form an initial replacement image equal in size to the marked image. Process flow continues at this point with a fine alignment sub-process shown in FIG. 9 which will be described subsequently, and then returns here.

If all the strips of the chosen marked image have been processed (824), the process proceeds to (826); otherwise, the next horizontal strip in the sequence is chosen (825), and process steps (815) through (824) are repeated.

Process flow continues at this point (826) with an image comparison sub-process shown in FIG. 10 which will be described subsequently, and then returns here.

If all the strips have been chosen and both the left and right sides of the marked image have been processed, the parallel obverse and reverse processes merge and proceed to (829); otherwise, the right image is selected (828) and process steps (807) through (827) are repeated.

If all the marked image pairs are complete (829), the process terminates (831) with all source images printed, scanned, coarsely aligned, finely aligned and compared; otherwise, the next marked image pair in sequence is selected (830), and process steps (807) through (829) are repeated.

Compensating the Scanned Pixels for Sensor Variations

Pixel brightness values, denoted as the functions $f(u_i, v_i)$, are not taken directly from a scanned image of the second image stream. Since the value $f(u_R, v_R)$ is computed by interpolation and is a weighted average of values of its three surrounding neighbors $f(u_A, v_A)$, $f(u_B, v_B)$, $f(u_C, v_C)$, and since in the preferred embodiment each pixel value is digitized by a separate sensor in one of two physically separate linear arrays [top or bottom of the web] in the Print Verification Unit (FIG. 1, (113)), each of the sensing elements needs to be compensated individually in terms of the black and white values it senses. If there are J pixel brightness sensing elements for each line, and $B_j$ and $W_j$ are the measured pixel brightness values when the sensor j ($1 \leq j \leq J$) is sensing a printed black test patch and blank paper, then, for line i, the compensation equation is:

$$f(u_j, v_i) = \min[\max[(f^*(u_j, v_i) - B_j)/(W_j - B_j), 0], 1] \quad (10)$$

where $f^*(u_j, v_i)$ are the uncompensated brightness values measured by the individual sensing elements.

Fine Alignment of Images of the First and Second Streams

Further alignment of pels in the initial replacement image relative to corresponding pels in the source image is usually needed in the horizontal direction [across the web] (and, fortunately, much less so in the vertical direction [along the web]) because of the unpredictably bad behavior of paper. In the small dimensions of a single pel, paper behaves much like the wood from which it is made. Paper warps, shrinks and expands based on its moisture content, and its moisture content varies rapidly based on the temperature and humidity of objects it comes in contact with. Further fine alignment of pels in the initial replacement image produces yet another image, herein called the final replacement image.

Fine alignment of pels requires slicing the horizontal strips of the initial replacement image into vertical stripes. In the preferred embodiment, fine alignment will be facilitated by computing the one dimensional [horizontal] cross-correlation function of the pel values of the initial replacement image and the source image on a strip-by-strip and a stripe-by-stripe basis. (For convenience, the cross-correlation function is also referred to herein as the correlation function.) In the preferred embodiment, the stripes are approximately 0.25 inches wide and one inch high. At the example 600 pels per inch and 600 lines per inch, stripes are 600 lines high and 150 pels wide. In the preferred embodiment, as a convenience for the computer the width of the stripe is increased to 160 pels; with each pel value represented by one bit, each line of stripe width is represented in the computer's memory by five 32-bit words. As a computational convenience also, each line of the initial replacement image is expanded by 64 pels of white (two 32-bit words set to zero) on its left side.

Evaluation of the horizontal cross-correlation between the initial replacement image and the source image is begun with the leftmost stripe of the strip. Binary pel values are referenced thirty-two at a time, that is, as one 32-bit word. The index m, ($1 \leq m \leq 600$) is used to reference the lines of the strip and the index n, ($1 \leq n \leq 5$) is used to reference groups of 32-pel values [32-bit words] in each line of the stripe.

Figure 5:
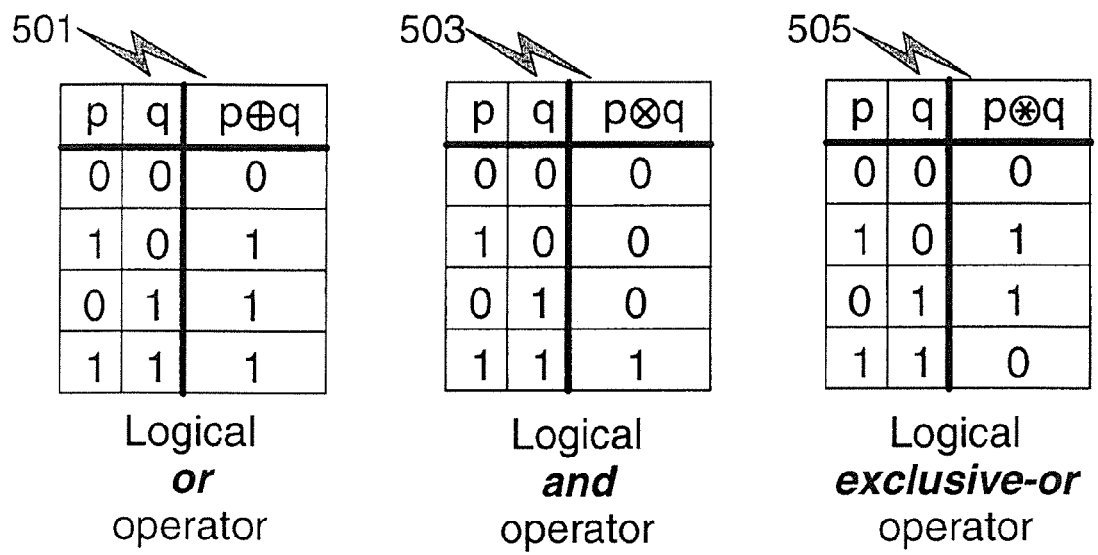
FIG. 5 shows defining "truth-tables" for the logical or, and and exclusive-or operators.

The cross-correlation function is denoted as C(k), where k is the number of pel positions of horizontal offset in lines of the initial replacement image relative to pel positions in lines of the source image, and where k is positive if pels of the initial replacement image are offset to the right of pels in lines of the source image. Since the two images have one bit per pel, very significant simplification can be achieved in computation of the cross-correlation function. Multiplication of pixel brightness values in the cross-correlation function can be replaced by a bit-wise logical exclusive-or, symbolized herein as ⊕, which operates on thirty-two pixel values at a time. FIG. 5 shows the defining truth-table of the exclusive-or operator for single bit operands (505). The summation of sub-products in the cross-correlation function is replaced by a sum of the count-of-ones remaining after application of the 32-bit exclusive-or operation.

For an example single stripe, five words in width and with pels in lines of the initial replacement image offset thirty-two pel positions [one word] relative to pels in lines of the source image, the simplified cross-correlation function is given by:

$$C(32) = \sum_{n=1}^{5}\sum_{m=1}^{600} \text{count1s}(S(m,n) \circledast R_{[0]}(m, n-1)) \quad (11)$$

where S(m,n) refers to 32-pel words of the source image line, $R_{[0]}$(m,n−1) refers to 32-pel words of the initial replacement image line, and the function count1s returns the count of bits in its 32-bit argument that have the value 1. [Note that the index value n−1 causes pels of the initial replacement image lines to be offset thirty-two pel positions to the right of pels in the source image lines, which, initially, is redundantly indicated by the zero subscript of R].

Computation of another value in the cross-correlation function of the stripe, for example, C(30), requires that all pel values in lines of the initial replacement image strip are physically shifted two pel positions to the left. The pel values of the two vacated pel positions at the right end of each line are filled with zeros. Recall that 64 pel positions with values set to zero were previously appended to the left end of lines of the initial replacement image, so until the cumulative shift of pel positions exceeds 64, only the added zero value pels will be discarded. For the instance C(30), Equation (11) can be restated as:

$$C(30) = \sum_{n=1}^{5}\sum_{m=1}^{600} \text{count1s}(S(m,n) \circledast R_{[2]}(m, n-1)) \quad (12)$$

with $R_{[2]}$(m,n−1) referring to pel values in the initial replacement image strip that have been physically shifted two pel positions to the left, as signified by the subscript [2] of $R_{[2]}$ (m,n−1).

The procedure as described is repeated until the pel values have been shifted left, for the example two pel positions at a time, until the accumulative shift of pel values reaches 64, and the corresponding value in the cross-correlation function of the stripe, C(−32), is evaluated by:

$$C(-32) = \sum_{n=1}^{5}\sum_{m=1}^{600} \text{count1s}(S(m,n) \circledast R_{[64]}(m, n-1)) \quad (13)$$

The process, left shifting pels two pel positions at a time, leads to 65 evaluations of the cross-correlation function for the single stripe. The best alignment of the two image stripes occurs at the least value of the cross-correlation function. [Note that a perfect alignment of the two image stripes, black pels to black pels and white pels to white, produced by some shift value k will produce a C(k) having a value of zero.] By taking the offset pel location k* of the smallest value of at the cross-correlation function evaluation C(k*), together referred to herein as a pair, and two additional pairs of values, one on either side of the minimum, a parabola can be fit through the three pairs of values. The pel position value at the inflection point of the parabola, $k_{min}$, is a very good estimate of the best alignment between the initial replacement image and the source image for the particular stripe in the particular strip.

A parabola having a horizontal directrix is given by:

$$C(k) = P_2 k^2 + P_1 k + P_0 \quad (14)$$

and the slope along the parabola by:

$$\frac{dC(k)}{dk} = 2P_2 k + P_1 \quad (15)$$

Fitting a parabola through the three pairs of values selected above is specified in matrix form as:

$$\begin{bmatrix} C(k^*) \\ C(k^*-1) \\ C(k^*+1) \end{bmatrix} = \begin{bmatrix} (k^*)^2 & k^* & 1 \\ (k^*-1)^2 & k^*-1 & 1 \\ (k^*+1)^2 & k^*+1 & 1 \end{bmatrix} \begin{bmatrix} P_0 \\ P_1 \\ P_2 \end{bmatrix} \quad (16)$$

The coefficients of the fitted parabola can then be solved for as:

$$\begin{bmatrix} P_0 \\ P_1 \\ P_2 \end{bmatrix} = \begin{bmatrix} (k^*)^2 & k^* & 1 \\ (k^*-1)^2 & k^*-1 & 1 \\ (k^*+1)^2 & k^*+1 & 1 \end{bmatrix} \begin{bmatrix} C(k^*) \\ C(k^*-1) \\ C(k^*+1) \end{bmatrix} \quad (17)$$

The pel position value at the inflection point of the parabola, that is, where the slope of the parabola is zero, is given by:

$$k_{min} = \frac{-P_1}{2P_2}. \quad (18)$$

The pel position value, $k_{min}$, is a very good estimate of the horizontal alignment between the initial replacement image and the source image for the stripe, but it is only an average value of the alignment across the stripe, and it does not include any vertical alignment correction, which could also be necessary under extreme conditions.

Those familiar with the art will recognize that there are pathological cases where the horizontal cross-correlation function applied to a stripe will produce an indefinite inflection point. An example that produces an obvious indefinite inflection point is a stripe intended to be blank paper. In that case, regardless of the number of pel positions a pel in lines of the initial replacement image is displaced relative to a pel in lines of the source image, the count-of-ones will always have a zero sum, and $k_{min}$ can not be evaluated. A blank-paper screen that will detect this particular case uses the logical or operator to combine all pel values (32 at a time, depending on the functional word length of the example computer employed) of every line of the source image stripe. If the logical or of all pel values in the stripe has a zero value, then the stripe is intended to be blank paper.

In addition to the blank-paper screen is a screen that will detect indefinite inflection points. The preferred embodiment of a screen requires the minimum value of the cross-correlation function, C(k*), to have two defined neighbors, C(k*+1) and C(k*−1), and further, requires the positive difference between C(k*) and at least one of its neighbors to be greater than a specified threshold value. If either of the screens gives evidence of an indefinite inflection point, the inflection point from the same stripe in the immediately preceding strip is used instead. This requires, for completeness, that as part of the initialization process a carefully constructed source image guaranteed to produce no indefinite inflection points is printed. This initialization will insure that all stripes in subsequent strips will have an immediately preceding stripes possessing defined values for their inflection points, and if necessary, the inflection points will be passed on from strip to strip.

Figure 6:
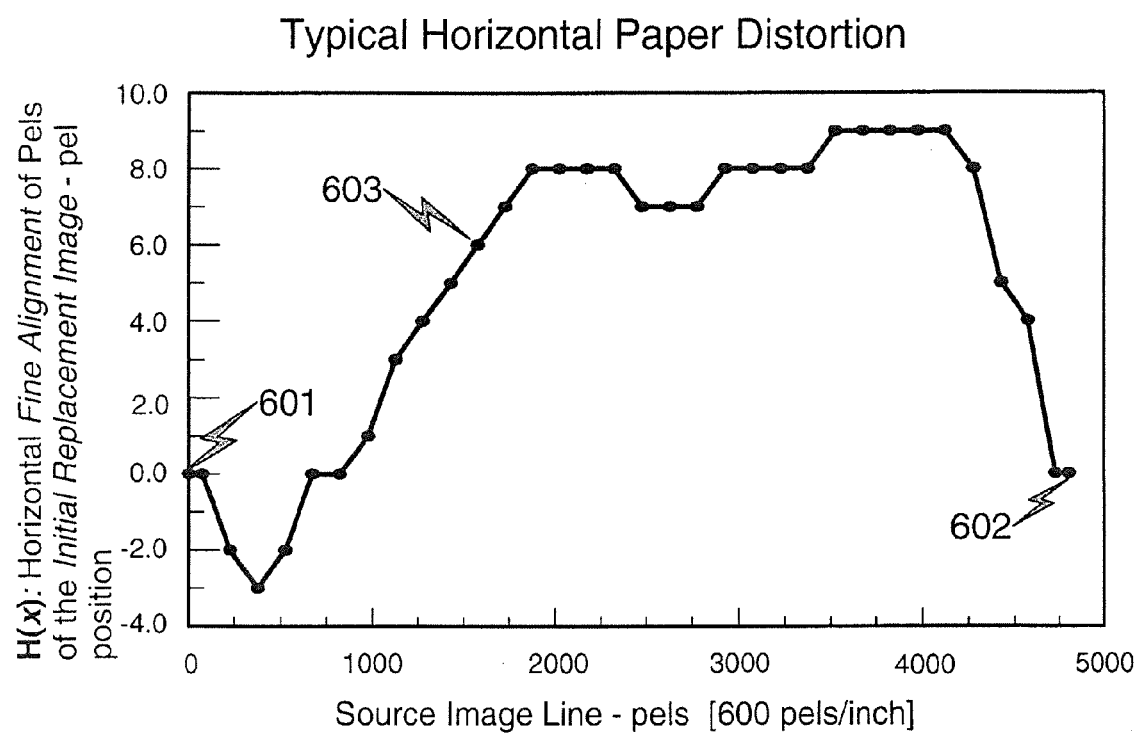
FIG. 6 shows typical horizontal paper distortion measured by methods of the present invention.

Referring to FIG. 6, values of $k_{min}$ in every stripe of an example eight inch strip are shown. The edge alignments (601) and (602) are determined by the affine transform used in the course alignment to produce the initial replacement image. The intermediate values of $k_{min}$, each shown as a separate point such as (603), are determined for every stripe in the strip by repeating the described procedure while indexing horizontally through the pel locations of the lines of the two images in the strip. Values between the intermediate values are determined by straight line interpolation.

Thus, for every source image pel position, a further correcting horizontal offset of pel positions in the initial replacement image is estimated, and that further correcting horizontal offset, herein called a fine alignment, is applied in addition to the affine transform together forming the final replacement image from the corresponding scanned image of the second stream. Hence, if the interpolated values of fine alignment, shown in FIG. 6 as a function of source image pel position x, are denoted as the function H(x), then by a modification of Equation (1):

$$\begin{bmatrix} u \\ v \end{bmatrix} = \begin{bmatrix} U_x & U_y \\ U_x & U_y \end{bmatrix} \begin{bmatrix} x + H(x) \\ y \end{bmatrix} + \begin{bmatrix} U_c \\ U_c \end{bmatrix} \qquad (19)$$

the interpolated values of the final replacement image pixel values can be determined. This is accomplished by reapplying Equation (8) using value (u,v) determined from Equation (19), with the appropriate instances of the coefficients $\{U_x, U_y, U_c, V_x, V_y, U_c\}$. Note that values of (x,y) will be pairs of integers, but values of (u,v) will generally not be.

Construction of a finely aligned replacement for a section of the scanned image can now be completed. For every pel location within or on the boundary of the rectangle defined by the four coordinate-pairs from the source image, (307),(308), (310),(311), a point of interest is computed using Equation (19), applying the same first instance of the coefficients $\{U_x, U_y, U_c, V_x, V_y, V_c\}$ as before. At each point of interest a pixel brightness value is interpolated using Equation (8), also applying the same first instance of the coefficients $\{U_x, U_y, U_c, V_x, V_y, V_c\}$ as before. The interpolated pixel brightness value is placed into an array of pixel brightness values that have a one-to-one positional correspondence with the source image pel location used to evaluate the point of interest. In this manner a section of a new image, herein called the final replacement image, is constructed, and it is placed in the same location in the final replacement image as the section bounded by the four coordinate-pairs (307),(308),(310),(311) has in the source image. In the preferred embodiment, the interpolated pixel brightness values are binarized. The criterion used for binarization in the preferred embodiment is again simple thresholding; if the pixel brightness value is less than a threshold value it is set to 1; otherwise, it is set to 0. An example threshold value is 50% of the maximum brightness value.

A flow chart of a fine alignment process is shown in FIG. 9. Fine alignment is actually a sub-process of coarse alignment, with connection shown in FIG. 8 (823), but is described in detail here.

Referring to FIG. 9, fine alignment is supplied a horizontal marked source image strip and a corresponding initial replacement image strip as a strip pair (901). The horizontal strips are divided into a number of corresponding vertical stripes, each having the same dimensions, and arranged to be processed sequentially (905). In the example above the stripes are 160 pels wide and 600 lines high. The first pair of stripes, one marked source image stripe and a corresponding initial replacement image stripe, are chosen to continue.

The horizontal cross-correlation of the two vertical stripes is evaluated with the two stripes aligned initially, to produce a first correlation value (907). Then all pels of the initial replacement image stripe are offset horizontally first left and then right relative to the pels of the marked source image stripe, and a correlation value is computed at each offset. Additional offsetting of pels and additional computing of correlation values is continued until the an optimal correlation value has been straddled. In the preferred embodiment shown hereinbefore, the optimal correlation value, and the computed value nearest to it, will be minimum values. Thus at least three correlation values between the vertical stripes of the chosen stripe pair are produced (907).

The offset and correlation value nearest the optimal correlation value and the offsets and correlation values of its two nearest neighbors are selected (909). The three offsets and their corresponding correlation values are used to find, by interpolation, the offset of the optimal correlation value, herein called the optimal offset of the stripe (911). The optimal offset of the stripe is paired with the pel position of the center of the vertical stripe that produced it, and the pair, herein called an optimal-offset pair, is retained for subsequent use. If the optimal offset of all stripes have been evaluated (913), the process continues to (915); otherwise, the next stripe pair in the sequence is selected (914) and process steps (907) through (913) are repeated using the next selected stripe pair.

When all stripe pairs have been selected and all the optimal-offset pairs evaluated, the optimal-offset pairs are arranged in pel position order to form discrete values of a fine alignment function (915). The independent values of the fine alignment function are the horizontal pel positions of the marked source image, and the dependent values are the fine alignment corrections to those pel positions that have been determined from the cross-correlation evaluations. The fine alignment values are a measures of average paper distortion within each stripe. An example fine alignment function is shown in FIG. 6. Intermediate values of the fine alignment function are determined by piece-wise linear interpolation, illustrated by the straight interconnecting lines in FIG. 6.

The final step of fine alignment process is to produce a strip of the final replacement image by the same interpolation methods used to produce the strip of the initial replacement image, with one important exception; for the scanned image pixel value interpolation, the horizontal coordinate of the pel of the source image is increased by the piece-wise interpolated fine alignment value in all reevaluations of the points of interest (917).

Developing Comparison Masks from the Final Replacement Image and the Source Image In the preferred embodiment, where every source image and every final replacement image are binarized, that is, having one-bit pel values, direct comparison of pel values can be done in an efficient and straightforward manner by employing 32-bit logical operators, depending on the computer used. To do the comparison, two masks are formed from the pel values of each of the two images. Each mask is itself another binariazed image with size equal to that of the source image, and in the preferred embodiment, also with size equal to that of the final replacement image. The four masks, specific to each image, will be referred to as the source dilation-mask, the source erosion-mask, the replacement dilation-mask and the replacement-erosion mask. In the preferred embodiment, black pel values are set to one and white pel values to zero.

Figure 7:
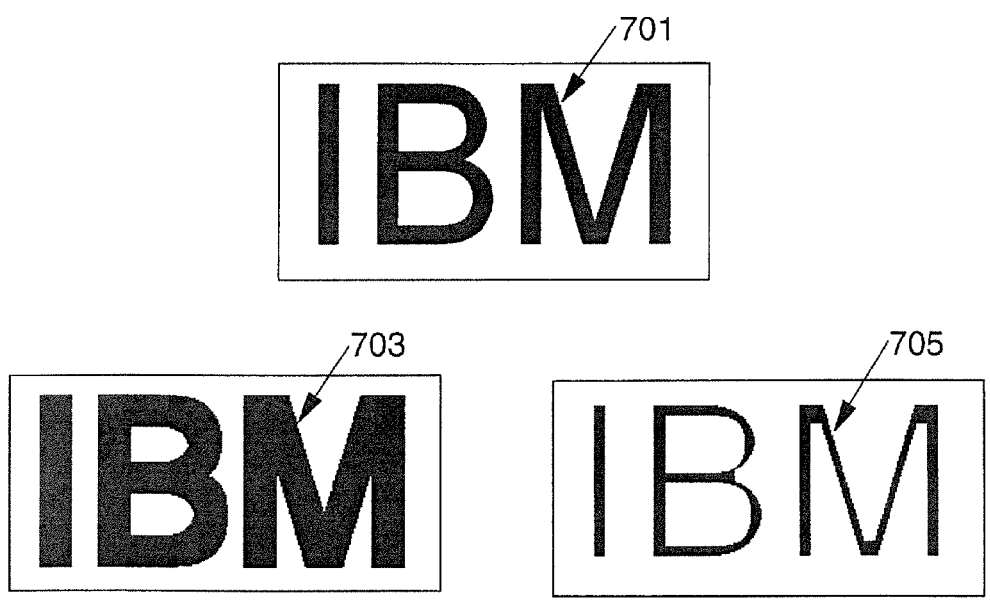
FIG. 7 shows a normal image along with dilation and erosion masks created from the normal image using methods of the present invention.

The source dilation-mask and the replacement dilation-mask are formed by a process herein called dilation. Construction of the source dilation-mask will be described. Dilation is started by setting all pel values in the source dilation-mask mask to zeros, which represent white pels. The pel position of each black pel in the source image forms a pel-center at the same location in its corresponding source dilation-mask, and a pel-array centered at the pel-center is filled with black pels in the mask. In a preferred embodiment, a pel-array with a size designation of "three" is represented by nine black pels arranged in a 3 pel by 3 pel square. If the dilation size designation is an even integer P, the pel array is represented by $P^2$ black pels in a P by P array, and the pel-center of the array is arbitrarily chosen to be the upper-left pel closest to the center of the pel array. Dilation-masks formed in this manner produce text, lines and halftone patterns that appear to be made of thicker strokes than those of the original image, that is, they appear "dilated." Referring to FIG. 7, a source dilation-mask (703) produced from a source image (701) by the described method is shown. The replacement dilation-mask is generated from the final replacement image in the same manner.

In a like manner the source erosion-mask and the replacement erosion-mask are formed by a process herein called erosion. Construction of the source erosion-mask will be described. Erosion is started by setting all pel values in the source erosion-mask mask to ones, which represent black pels. The pel position of each white pel in the source image forms a pel-center at the same location in its corresponding source erosion-mask, and a pel-array centered at the pel-center is filled with white pels in the mask. In a preferred embodiment, a pel-array with a size designation of "three" is represented by nine white pels arranged in a 3 pel by 3 pel square. If the erosion is an even integer P, the pel array is represented by $P^2$ white pels in a P by P array, and the pel-center of the array is arbitrarily chosen to be the upper-left pel closest to the center of the pel array. Erosion-masks formed in this manner produce text, lines and halftone patterns that appear made of thinner strokes than those of the original image, that is, they appear "eroded." Again referring to FIG. 7, a source erosion-mask (705) produced from a source image (701) by the described method is shown. The replacement erosion-mask is generated from the final replacement image in the same manner.

Detection of Significant Defects in the Printed Copy

Comparison of the two images is done using the generated masks. Dilation and erosion masks are thus used to allow tolerance of a small positional uncertainty in the alignment of the final replacement image with the source image. In all cases, the source image is considered to be an errorless copy of what was intended to be printed. The final replacement image, whose origin is directly traceable to a scan of the printed copy, may not be error free because of defects in the printing process. Detection of these defects is the essence of the present invention. In the preferred embodiment, the source image, the source dilation-mask, the source erosion-mask, the final replacement image, the replacement dilation-mask, and the replacement erosion-mask are all binarized images with each pel represented by a single binary bit; the binary pel values of the six images will be referred to as $S(x,y)$, $S_D(x,y)$, $S_E(x,y)$, $T(x,y)$, $T_D(x,y)$, and $T_E(x,y)$, respectively, and where (x, y) are the indices of the image line, y, and pel location within that line, x. Comparison of the pel values of specific pairs of these images can be done using logical operators.

The preferred embodiment for detecting unintended application of ink in a single pel on the printed page is the simple equation:

$$(S_D(x,y) \oplus T_E(x,y)) \otimes (S_D(x,y)) = 1 \tag{20}$$

where the logical operators ⊕ [or] and ⊗ [exclusive-or] are defined in FIG. 5 (501) and (503). If Equation (20) is evaluated to be zero, no unintended ink is detected. Those familiar with the art will recognize that alternatives combinations can be used in place of Equation (20) with similar results; for example:

$$(S_D(x,y) \oplus T(x,y)) \otimes S_D(x,y) = 1$$

$$(S(x,y) \oplus T_E(x,y)) \otimes S(x,y) = 1 \tag{21}$$

Since digital computers are capable performing bit-wise logical operations on 32 pels with a single instruction, depending on the computer used, significant efficiency of comparison of pel values is obtained.

The preferred embodiment for detecting the unexpected absence of ink in a single pel on the printed page is the equation:

$$(S_E(x,y) \otimes T_D(x,y)) \otimes S_E(x,y) = 1 \tag{22}$$

where the logical operator ⊗ [and] is defined in FIG. 5 (502). If Equation (22) is evaluated to be zero, no unexpected absence of ink is detected. Those familiar with the art will also recognize that alternatives combinations can be used in place of Equation (22) with similar results.

To obtain a lower false detection probability, a small cluster of detected pels, for example, a 2 pel by 2 pel square area, can be used in which a detection must be made in two adjacent pels at the same location in two adjacent lines before a detection is deemed to be significant. This is consistent with the premise that at 600 pels per inch and 600 lines per inch no meaningful information is conveyed to a human viewer by a single pel.

A flow diagram of an image comparison sub-process is shown in FIG. 10. Image comparison is actually a sub-process of coarse alignment, with connection shown in FIG. 8 (826), but is described in detail here.

The sub-process is supplied a marked source image and a corresponding final replacement image (1001). Note that the supplied images are full page images, not image strips, and by process design they have equal horizontal and vertical pel dimensions. If the pel values of either image are not one-bit values, they are converted to one-bit values by thresholding (1003) such that black pel values are 1 and white pel values are 0.

Dilation and erosion masks are formed for each image. Those for the marked source image are referred to as $S_D$ and $S_E$ (1005), and those for the final replacement image are referred to as $T_D$ and $T_E$ (1007). The masks have horizontal and vertical pel dimensions equal to those of the marked source image. The pel positions in the masks are ordered sequentially by positions in a line, left to right, then by lines from the top of the image to the bottom.

A first pel position is selected from the sequence (1009). Unintended application of ink in the selected pel is detected by forming a first intermediate result as the logical or of selected pel value of $S_D$ with the selected pel value of $T_E$, then the logical exclusive-or of that first intermediate result with the selected pel value of $S_D$ (1011). If the final value of the two operations is a 1, the unintended application of ink in that pel is detected, and the pel location of the detection is noted for later use.

The absence of intended ink in the selected pel is detected by forming a second intermediate result as the logical and of selected pel value of $S_E$ with the selected pel value of $T_D$, then the logical exclusive-or of that second intermediate result with the selected pel value of $S_E$ (1013). If the final value of the two operations is a 1, the absence of intended ink in that pel is detected, and the pel location of the detection is noted for later use.

A defective printed copy is declared (1017) if at least one of the following conditions exists:
  a) Two or more adjacent pels in the same pel positions in two or more adjacent lines have unintended ink application.
  b) Two or more adjacent pels in the same pel positions in two or more adjacent lines have the absence of intended ink.

If all image pels have been chosen, the sub-process returns control (1019); otherwise, the next pel position in sequence is selected (1020) and steps (1011) through (1019) are repeated.

Streak and Splotch Detection

For very high quality printing, detection of streaks and splotches can be used to reject printed copies that, although still readable by a human viewer, are cosmetically undesirable. Minor variations of the methods documented hereinbefore can be used. For these purposes, a second criterion for binarization of the final replacement image is used. Although the criterion is still simple thresholding, a different threshold value, for example 25% instead of 50%, is used. This lower threshold value causes relatively light shades of gray to be binarized into black. Additional screening of the detection of unexpected black must be used to avoid excessive detection rates caused by insignificant flaws. For streaks, an additional screen requires a detection to occur in the same pel location in a large number of consecutive lines, for example, 100 lines, before the combined detection is declared a streak. For splotches, another additional screen requires a detection to occur in a relatively large area, for example 90% of pels in a 100 pel by 100 pel area, before the combined area detection is considered a splotch.

Although a number of variations of the preferred embodiments have been noted, it will be clear to those skilled in the art that many other variations and modifications to the disclosed embodiments can be effected without departing from the spirit and scope of the invention. An obvious variation would be the use of a computer capable of processing 64-bit words instead of 32-bit words. The described embodiments ought to be construed to be merely illustrative of some of the more prominent features and applications of the invention. Other beneficial results can be realized by applying the disclosed invention in a different manner or modifying the invention in ways known to those familiar with the art.

Although the preferred embodiment of the present invention is for monochrome digitized images and monochrome printed copy, those skilled in the art will understand that for a color image, each pixel of the digitized image has associated values representing the magnitudes of average brightness of its at least three color components represented in three or more color planes. The color components are associated with spectrally dispersed primary colors used to represent a broad range of colors in the visible color spectrum, and the values of the at least three color components are the relative brightness of the three primary colors used to represent a particular color.

The preferred embodiment of the present invention will use only monochrome source images having pel values of one binary bit. The source images could include any content but in the preferred embodiment are composed primarily of text and simple geometric structures, such as outlining boxes or grids. Specifically, the source images of the preferred embodiment do not contain subparts that are halftoned images of natural or artificial scenes.

I claim:

1. A print verification unit comprising:
    an interface to receive one or more digitized source images;
    a computer memory to store the digitized source images;
    one or more image scanners to scan printed data from a medium to generate one or more corresponding scanned images; and
    a processor to perform:
        an alignment process to generate a replacement image from the scanned image by tagging each line of the scanned image with one or more tag pairs associated with one or more synchronization strips embedded in the digitized source image to generate additional lines in the scanned images to correspond to the digitized source images, and align the replacement image with the digitized source image on a page and page, line by line, and pel by pel basis; and
        a comparison process that compares one or more source pels of the digitized source image with one or more corresponding scanned pels of the replacement image to determine differences, the differences being defects in the printed copies.

2. The verification unit of claim 1, wherein the alignment process comprises a course-alignment to produce an initial replacement image and a fine alignment to produce a final replacement image.

3. The verification unit of claim 2, wherein the course alignment is a repeated application of an affine transform of source image pels and the fine alignment is a repeated application of a one dimensional cross-correlation of one or more course aligned pels to source pels.

4. The verification unit of claim 1, wherein the alignment process comprises:
    embedding two or more vertical synchronization-strips into the digitized source image;
    printing the synchronization-strips on the printed copy;
    scanning the printed copy so that two or more scanned vertical synchronization-strips are embedded in the scan copy, the vertical synchronization-strips being separated by a first separation distance;
    tracking the horizontal and vertical coordinates of one or more sequential and specifically identifiable features in lines of the synchronization-strip to create a line by line correspondence between the source image and the corresponding scanned image;
    performing a scanned image pixel value interpolation based on an affine transform, comprising the following steps:
        sub dividing the source image and scanned image into one or more source and scanned horizontal strips, respectively;
        determining at least two corresponding points on two corresponding lines in the source and scanned images, the two corresponding lines separated by a second separation distance;
        using at least four of the corresponding points, two at a time from each of the lines to develop a transformation of the coordinates of pels in the source image to points of interest in the scanned image; determining an interpolated pixel value of the scanned image at the point of interest; and
        for each pixel, placing the interpolated pixel value into an initial replacement image at the pel coordinates corresponding to the pel of the source image used to determine the point of interest.

5. The verification unit of claim 4, wherein the alignment process further comprises:
dividing the source image into a plurality of initial source horizontal strips; dividing one of the source horizontal strips into a plurality of source vertical stripes;
dividing the initial aligned image into a plurality of initial aligned horizontal strips;
dividing one of the aligned horizontal strips into a plurality of initial vertical stripes;
dividing the initial horizontal strip corresponding to the respective source horizontal strips into a plurality of initial vertical stripes, the source vertical stripes and the initial vertical strips corresponding to one another and having the same height and width;
determining three or more cross-correlation values between the source and initial vertical stripes for an initial horizontal alignment and two or more horizontal offsets between the source and initial vertical stripes;
using the three or more cross-correlation values and their corresponding offsets to further determine an interpolated offset that produce the optimal correlation value;
producing an interpolated offset for each pair of source and initial vertical stripes;
performing a piece-wise interpolation between the interpolated offsets to develop a fine alignment that is dependent on the horizontal pel position of the source image; and
re-performing the scanned image pixel value interpolation wherein a horizontal coordinate of the pel of the source image is increased by the piece-wise interpolated value of the fine alignment.

6. The verification unit of claim 1, wherein the comparison process comprises:
dilating the source image;
eroding the replacement image;
bit-wise or'ing the corresponding one-bit pel values of the dilated source image and the eroded replacement image to produce a first intermediate result;
bit-wise exclusive-or'ing the first intermediate result with the one-bit pel values of the dilated source image to indicate the pel locations of excess ink in the scanned image.

7. The verification unit of claim 6, wherein the comparison process further comprises declaring a defect only if two or more adjacent pel locations have an excess of ink.

8. The verification unit of claim 7, wherein the defect is declared in at least one of the following situations: two or more horizontally adjacent pel locations have an excess of ink, two or more vertical adjacent pel locations have an excess of ink, and two or more horizontally adjacent and two or more vertical adjacent pel locations have an excess of ink.

9. The verification unit of claim 1, wherein the comparison process comprises:
dilating the replacement image;
eroding the source image;
bit-wise and'ing the corresponding one-bit pel values of the dilated replacement image and the eroded source image to produce a second intermediate result;
bit-wise exclusive-or'ing the second intermediate result with the one-bit pel values of the eroded source image to indicate the pel locations of missing ink in the scanned image.

10. The verification unit of claim 9, wherein the comparison process further comprises declaring a defect if two or more adjacent pel locations are missing ink.

11. The verification unit of claim 10, wherein the defect is declared in at least one of the following situations: two or more horizontally adjacent pel locations are missing ink, two or more vertical adjacent pel locations are missing ink, and two or more horizontally adjacent and two or more vertical adjacent pel locations are missing ink.

12. The verification unit of claim 1, wherein the comparison process comprises the steps of:
thresholding and dilating the replacement image;
thresholding and eroding the source image;
bit-wise and'ing the corresponding pel values of the dilated replacement image and the eroded source image to produce a second intermediate result;
bit-wise exclusive-or'ing the second intermediate result with the eroded source image to indicate the pel locations of missing ink in the scanned image.

13. The verification unit of claim 12, wherein the threshold is any one of the following percentage of the initial pixel values: 5%-95%, 25%, and 50%.

* * * * *